(12) United States Patent
Chicoyne

(10) Patent No.: US 6,457,787 B1
(45) Date of Patent: Oct. 1, 2002

(54) FRAME JOINT SYSTEM

(76) Inventor: Stanford M. Chicoyne, 15 Foster Creek Drive, Newcastle On. (CA), L1B 1G1

( * ) Notice: Subject to any disclaimer, the term of this patent is extended or adjusted under 35 U.S.C. 154(b) by 13 days.

(21) Appl. No.: 09/708,675

(22) Filed: Nov. 9, 2000

(51) Int. Cl.⁷ .............................................. A47B 47/00
(52) U.S. Cl. ................. 312/265.4; 312/265.1
(58) Field of Search ........................ 312/265.1, 265.2, 312/265.3, 265.4, 257.1; 403/408.1, 403, 382; 108/155; 248/188.1; 211/183, 186; 52/290

(56) References Cited

U.S. PATENT DOCUMENTS

| | | | | |
|---|---|---|---|---|
| 2,714,540 A | * | 8/1955 | Diehm | 312/265.1 |
| 3,307,894 A | * | 3/1967 | Collier | 312/265.1 |
| 3,498,654 A | * | 3/1970 | Diaz et al. | 312/265.4 |
| 3,845,601 A | * | 11/1974 | Kostecky | 52/290 |
| 5,542,549 A | * | 8/1996 | Siemon et al. | 312/257.1 X |
| 5,956,916 A | * | 9/1999 | Liss | |
| 6,155,660 A | * | 12/2000 | Nicolai | 312/265.1 X |

* cited by examiner

Primary Examiner—Janet M. Wilkens

(57) ABSTRACT

A section-joining joint system for joining rigid sections in disassembable relation, enabling the provision of knock-down assemblies, such as frames, stands and the like, has a series of joints, each requiring the piercing of one of the joint members to form a projecting anchorage flap, and the application of a single tension member secured by the anchorage flap, the tension member being in the form of a bolt and nut in securing relation between the abutting joint members. Joints having as many as four members may be thus formed, which can include diagonal brace members. Carriage bolts having radius-profiled heads with squared inner head portions may be used as the bolting medium. The piercing operation can provide a perforated, projecting flap located adjacent the end of the member, and positioned to receive the tensioned (bolt) member in entered relation therethrough, the free end of the tensioned (bolt) member being passed through apertures in the adjoined structural members, enabling a nut to be applied to the bolt and tightened against the inner face of the projecting flap, drawing the joint members together in mutual compressive relation to complete the assembly of the joint. The joint members may be of U-section channel; also L-section members, and combinations thereof can be used. By the use of asymetrical joints, the structure can be rigidified, providing lateral and longitudinal stiffness. Two types of flap formation can be used, and a support can be introduced to limit flap deflection.

19 Claims, 3 Drawing Sheets

FRAME JOINT SYSTEM

BACKGROUND OF THE INVENTION

1. Field of the Invention

The present invention is directed to a structural joint system, and to the joining of structural members in frame-forming relation, in particular, to frames having dis-assemblable mechanical joints.

2. Description of the Prior Art

Metal members are widely used in fabricating structures, wherein a variety of structural sections are cut to length and joined to form a framework.

Such frames have a wide range of uses, ranging from knock-down shelving to frames for mounting machine tools, conveyors, etc.

One such knock-down system uses structural members consisting of a semi-enclosed C-section track having T-bolts slidably anchored within the section such that the bolt protrudes, to form an attachment anchor point.

One problem with such knock-down framing is the protrusion of bolt heads at the corners of the frame, which constitute a hazard to personel walking past, who can cut and scratch themselves and catch and tear their clothing on the projecting bolt or the nut head.

Another widely used method consists of joining the frame members by welding. This is time consuming and labour intensive, and provides a rigid, unitary construction quite unsuited for transportation, being space-consuming, and totally unsuited to knock-down and reassembly.

SUMMARY OF THE INVENTION

The present invention provides a section-joining joint system for joining rigid sections in disassembable relation, enabling the provision of knock-down assemblies, such as frames, stands and the like.

The subject joint utilizes the piercing of at least one of the joint members, and the application of a single tension member in the form of a bolt and nut in joining relation between the adjoined members. A round-headed carriage bolt with locking head portion may be used, where the bolt locking head portion is located within a corresponding square recess, to rotationally lock the bolt. In one embodiment, the inward piercing operation, carried out on the web portion of the U-section rail, provides a perforated, projecting flap located between the section flanges adjacent the end of the rail, and positioned to receive the tension member, a carriage bolt, in entered relation therethrough. The bolt is inserted inwardly through apertures in the adjoining structural members and the flap perforation, enabling a nut to be applied and pulled tight against the back of the flap, tensioning the bolt, which compresses the members into mutual compressive relation, to complete the joint, while generating high friction forces at abutting faces of the joint members.

In the case of U-section members, which are generally awkward to bolt together, the subject system enables the joining of three such members in mutually joined relation as a stable three-dimensional structure.

In some instances, the orientation of the bolt may not be critical, due to the protection afforded to any projecting nut/bolt portions by the outstanding flange portions of the outermost U-section.

The system advantageously incorporates carriage bolts as the tensioning member, wherein the square-sectioned inner portion of the bolt head is housed within a sized, square recess punched in the outermost U-section. This ensures that only the rounded head portion of the carriage bolt, which is substantially flush, protrudes above the external surfaces of the joint. The punching of the square recess is an economical operation in a production line, while the immobilization of the bolt head minimizes labour and skill requirements for assembling and dis-assembling such joints, as the bolt is immobilized against rotation, such that the nut can be readily tightened or slackened.

The subject system may also be advantageously used with L-section angle-iron members, and combinations of different sections.

Thus there is provided a three-dimensional framework, at least one of the joints thereof having a single tensioned member securing the members of the joint in mutually compressive relation.

The tensioned member is secured by way of an aperture in a projecting web portion, struck from one of the members, to receive the nut of a tensioned bolt member in anchored relation therewith.

In the case of a frame including U-section members in joined relation, the end of one U-section is entered into the U-portion of an adjoining section, whereby adjacent portions of the members restrain each other against relative rotational movement about the tensioned member.

In one U-section frame embodiment having U-section rail portions entered within the "U" of the adjoining leg section, the adjoining cross member of the frame joint is positioned having its intermediate web portion backed onto the outer face of the web portion of the leg section.

If desired, this arrangement then permits the introduction of a flat diagonal cross-tie member, sandwiched between the cross member and the leg section.

In another embodiment, it is contemplated that the flange ends of the U-section cross member are relieved by the width of the U-section, and the flanges positioned inwardly, so that the relieved flange ends abut the side of the adjoined leg section, thereby locking the framework in rigid three-dimensional fixed relation.

The locking of a frame may also be achieved by way of an asymetrical joint combination. Thus, in a frame having four leg members, two rail members, and two cross members, the members are jointed by striking out a single flap from one end of each of the rails and cross members, and providing an aperture to receive a bolt member at the other end of each of the members. In the case where carriage bolts are used, such apertures are preferably made square, to receive and engage the square underhead portion of the carriage bolt. The adjoining leg members of each joint are provided with an aperture to receive the carriage bolt.

On assembling a frame, a first corner joint is formed, having a rail member with a flapped end inserted in the U of the leg, which is pressed against the rail-end by the tensioned bolt acting against the cross member, which is located outside the leg. For this corner the rail section maintains the leg in a vertical orientation, against lateral forces acting on the frame.

The adjacent second corner joint, having a cross member with a flapped end inserted in the U of the leg, has a rail member compressed against the flange portion of the leg by the tensioned bolt, serving to vertically stabilize the leg, by way of the cross member, against longitudinal forces acting upon the frame.

In this manner, the frame is stabilized laterally by the first joint and longitudinally by the second joint. This stabilization may be repeated in similar fashion at the other end of the frame, such that the respective flap/rail joints are diagonally across from each other, and similarly, the flap/cross member joints are diagonally across from each other. This particular form of asymetry has the particular advantage that each member of a frame (rails and cross members) receives the same flap and aperture treatment, thereby rendering assembly correspondingly straightforward.

It will be understood that other asymetric arrangements can be readily arranged. Thus, the punched-out flap or tongue can be provided at one or both ends of a member, and the other members of a respective joint may be accordingly perforated to receive the square head of a carriage bolt, or the barrel portion of a bolt in inserted relation.

The tension member may be a carriage or other type of bolt. However, the rounded head of the carriage bolt, and its self-locking square inner head portion, in conjunction with a punched square bolt hole to receive and lock that head against rotation, provides a combination that greatly facilitates assembly, with minimal skills and effort, the nut being readily accessible, on the inner face of the web flap.

The perforation for the bolt, in the punched-out web flap is preferably located closely adjacent the web, thereby minimizing the bending moment that is applied against the flap, when the bolt is tensioned. The aperture left by the flap facilitates insertion of the nut on the end of the carriage bolt. A spacer may be positioned about the bolt, in supporting relation with the web flap, to limit or prevent deformation of the flap by the tensioning of the bolt.

While in the preferred embodiment the flap strike-out is located in spaced relation from the end of the joint member, the flap strike-out can extend to the end of the member in some circumstances.

Uses of the subject join system are virtually unlimited, and include framework for shelving, desks, platforms, seats, foot rests, chairs, scaffolding, stairways, decks, ramps, walkways, partitions, ladders, bracing's, conveyor supports and frame rail, miscellaneous furniture, picnic tables, buildings, etc.

BRIEF DESCRIPTION OF THE DRAWINGS

Certain embodiments of the invention are described by way of illustration, without limitation of the invention thereto other than as set forth in the accompanying claims, reference being made to the accompanying drawings, wherein:

DETAILED DESCRIPTION OF THE INVENTION

Figure 1:
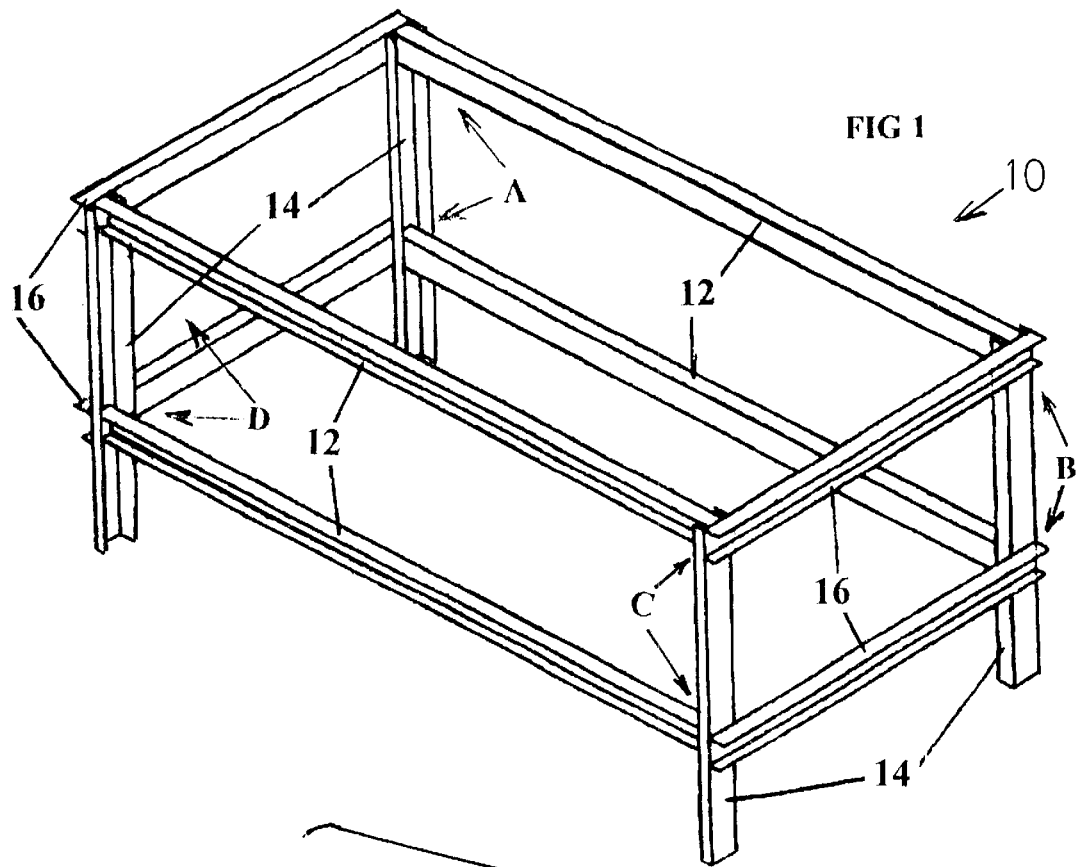
FIG. 1 is a perspective view of a first embodiment of a space frame fabricated in accordance with the present invention.
Figure 2:
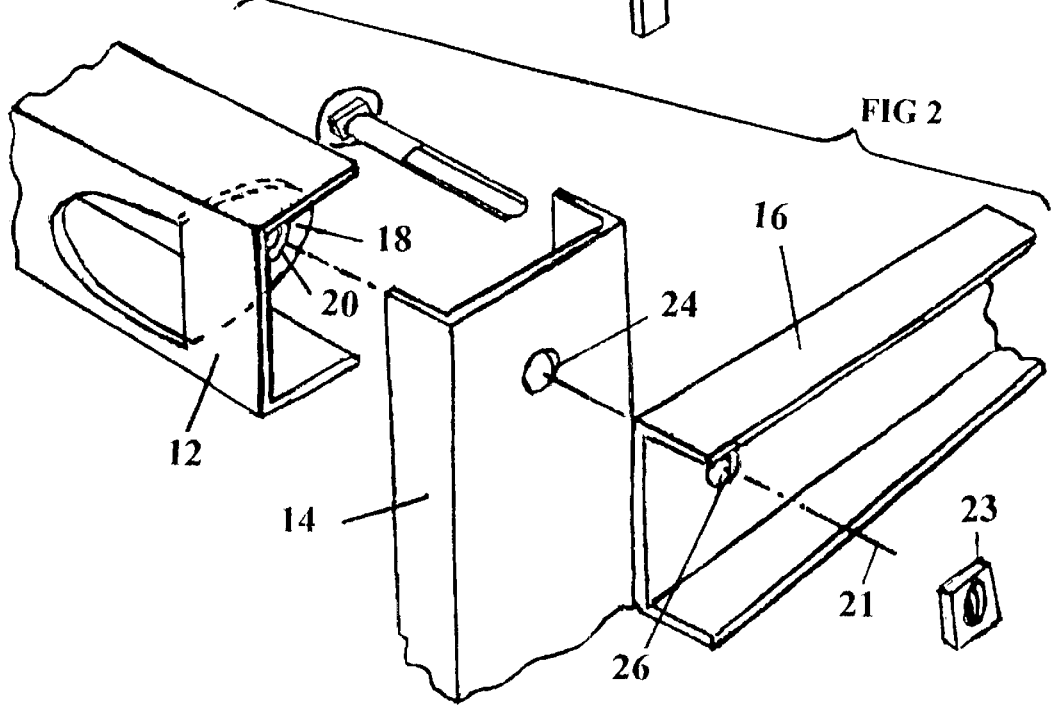
FIG. 2 is an exploded view, in perspective, of a three-member corner joint employed in the FIG. 1 construction.

Referring to FIG. 1, a frame 10 has rail members 12, leg members 14 and cross members 16, all of which may be joined by way of the three-dimensional joint arrangement shown in FIG. 2. FIG. 2 shows portions of a top rail member 12, a leg member 14 and a cross member 16, in mutually spaced relation. A tongue portion 18, struck from adjacent the end of rail 12 has an aperture 20 therein, to receive a bolt 22 (not inserted). The axis 21 of the bolt 22 is shown in relation to apertures 24, 26 of the leg 14 and cross member 16 respectively, along with nut 23. It will be understood that other forms of bolt may be used. In this instance, in view of the protection afforded the nut and bolt end by way of the flanges of the U-section 16, the bolt is illustrated reversed from it more usual orientation. Also, the U-sections 14, 16 may have circular holes 24, 26 rather than the punched square hole required for a carriage bolt to be seated home. Stability for the frame 10 is aided by the squared lower ends of the legs 14, and the high static friction generated between the inner surface of cross member 16 and the abutting surface of leg 14, as compresssed by the tightened bolt and nut 22, 23, at each of the eight joints.

Figure 3:
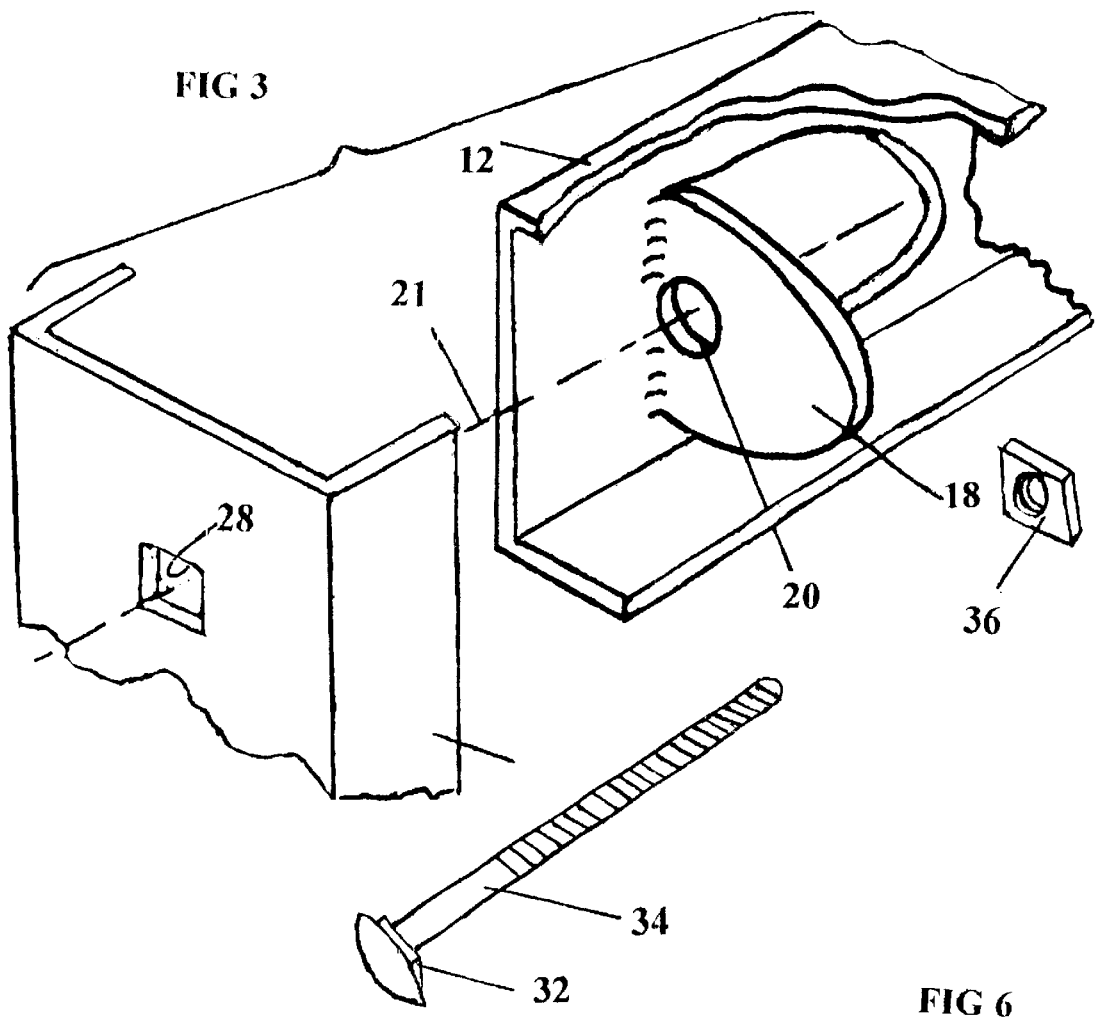
FIG. 3 is a perspective view of two of the structural elements of a further joint embodiment, showing a carriage bolt and nut style fastener, prior to assembly.

Turning to FIG. 3, the tongue portion 18 and its aperture 20 can be seen. The leg member 14 is shown having a square shaped aperture 28 punched therein, serving to lock the square inner head portion 32 of the carriage bolt 34 against rotation when the nut 36 is tightened. The bolt 34 has been illustrated as being unduly long, for purposes of visual association.

Figure 4:
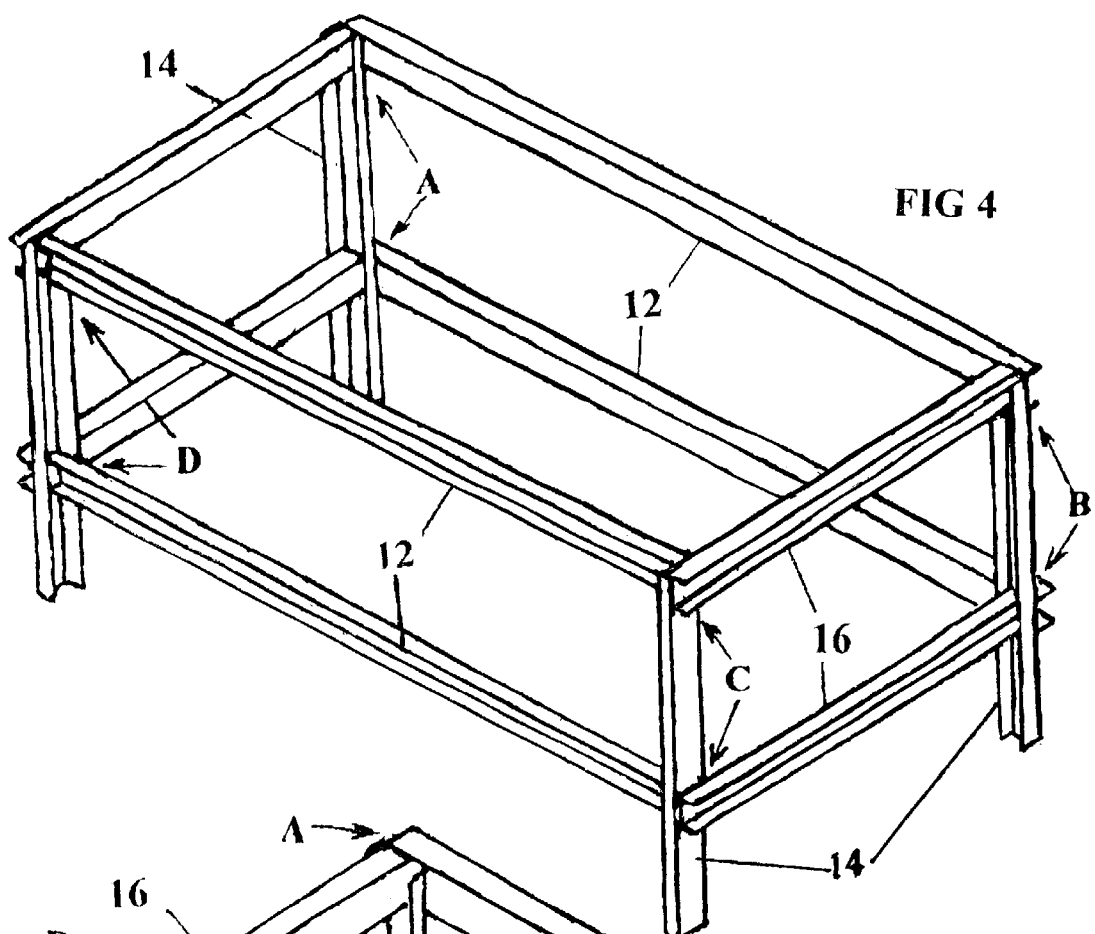
FIG. 4 shows a perspective view of a second embodiment space frame having a first asymetric joint arrangement.

Referring to FIG. 4, the joints are lettered clockwise A through D for ease of reference. The upper and lower joints being identically arranged, they are referred to, jointly, in the singular. Each joint A–D has the leg member 14 as the intermediate joint member, and having a bolt hole. The frame has four rail members 12, four leg members 14 and four cross members 16, as in the case of FIG. 1. In the case of joint A, the flap 18 is struck out of the cross member 16, with the leg 14 as the intermediate member, and the rail 12 having a square shaped aperture to receive and A lock the head portion 32 of a carriage bolt 34. Cross member 16 is entered within the U of leg 14. At joint B the order of arrangement is the same as for joint A.

At joint C the flap 18 is struck from the rail member 12; the cross member 16, being the outer member, has a square shaped aperture to receive and rotationally lock bolt head portion 32. At joint D the order of arrangement is the same as for joint C, with the flap 18 in the rail 12, and the cross member 16 outermost. For this FIG. 4 arrangement one (set of 2) of rails 12 have a flap struck out at each end; the other (two) rails 12 have a square hole at each end; all the cross members 16 have a flap struck out at one end and a square hole at the other end.

Figure 5:
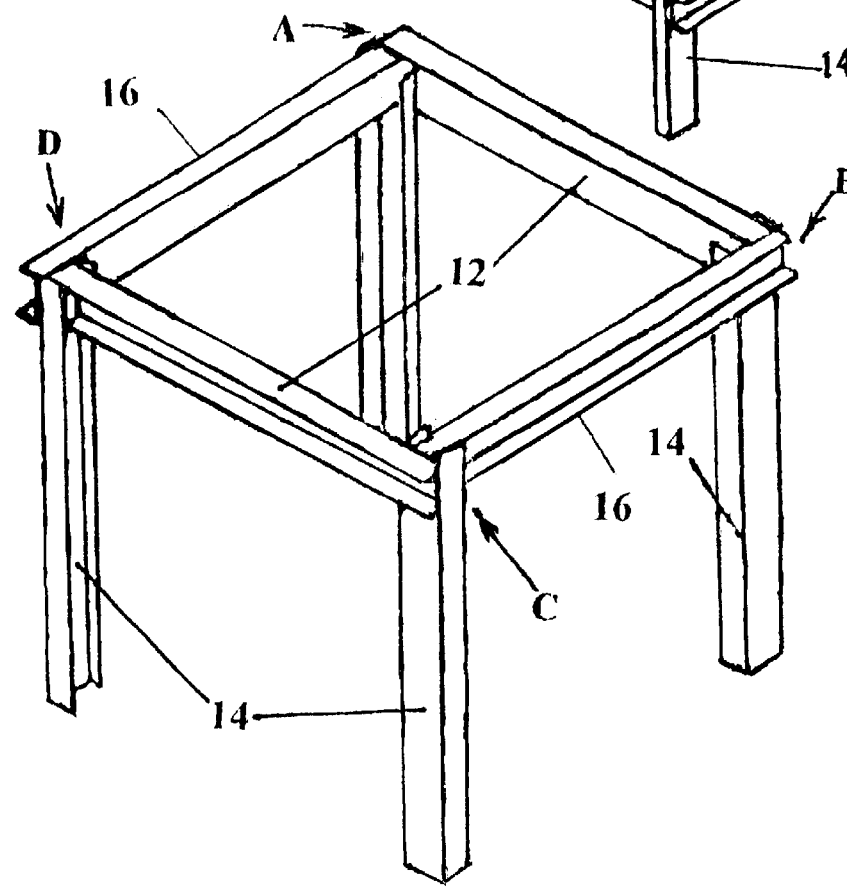
FIG. 5 shows a perspective view of third embodiment space frame having a second asymetric joint arrangement; and, FIG. 6 is a perspective view of a second flap embodiment, and a spacer.

FIG. 5 shows the respective joint arrangements for a symetrical/asymetrical arrangement with a standardized flap-and-hole arrangement for each rail 12 and cross member 16, consisting of a flap 18 at one end and a square hole at the other end. This then provides a frame having at two of the corners B and D, in mutual, diagonal relation the rail members 12 entered within the U of the legs 14, having the cross member 16 outside; and at the other two corners A and C, the cross members 16 are entered within the U of the legs 14, with the rail members 12 outside. In this instance, the rails 12 and cross members 16 are of equal length.

As stated above, the asymetry of such an arrangement stabilizes the frame members against lateral and longitudinal forces acting upon the frame.

Figure 6:
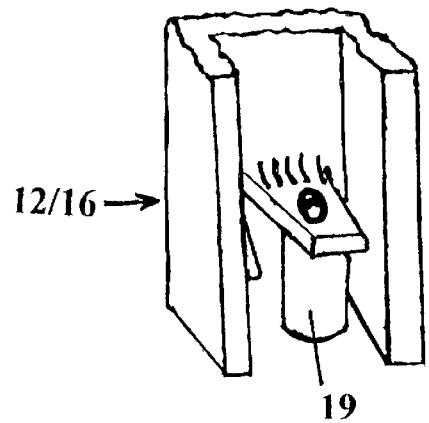

In FIG. 6, a member 12 or 16, indicated as 12/16 is shown, having a tongue flap portion 18 struck out, with a hollow cylindrical spacer 19 located in abutted supporting relation between the portion 18 and an underlying adjoining member (not shown), to which the member 12/16 is to be joined in the manner of FIGS. 2 or 3. On assembly of the joint, the joint securing bolt 34 (FIG. 3) passes through the spacer 19, to hold it in place, thereby preventing or at least limiting the deflection of the flap portion 18.

What is claimed is:

1. A section-joining joint system for joining rigid sections in disassembable relation, a joint of said system consisting of a first anchor member having a flap located in spaced relation from an adjacent end of said anchor member, with a first bolt hole therein, and at least one other member having a second bolt hole therein, said other member being attached to the anchor member by way of a bolt passing through the first and second bolt holes, the head of said bolt being located outwardly of the outermost member of said joint system.

2. The system joint as set forth in claim 1, including a third member abutting said at least one other member, having said bolt in securing relation therewith.

3. The system as set forth in claim 2 wherein said anchor member, said at least one other member and said third member are mutually at right-angles to each other, to form a three-dimensional structure.

4. The combination as set forth in claim 3, wherein said structure is readily disassembled.

5. The system joint as set forth in claim 2, in combination with a plurality of said first members and said other members and said third members and joints, to form a three-dimensional frame structure.

6. The combination as set forth in claim 5, wherein said structure is readily disassembled.

7. The combination as set forth in claim 5, wherein at least two said members have a U-section profile.

8. The system joint as set forth in claim 1, in combination with a plurality of like anchor members and said other members and said joints, to form a multi-sided frame structure.

9. The combination as set forth in claim 8, wherein said structure is readily disassembled.

10. The combination as set forth in claim 8, wherein at least two said members have a U-section profile.

11. A three-dimensional framework, having a plurality of straight horizontal and vertical members in mutually joined relation by way of a plurality of three-piece joints, to form a three-dimensional structure wherein at least one of the joints thereof has a single tensioned member securing the members of the joint in mutually compressive relation, said tensioned member being anchored by a flap secured to a said horizontal member and located in spaced relation from an adjacent end of said horizontal member.

12. A three-dimensional framework having a plurality of straight side members in mutually joined relation by way of a plurality of joints, wherein at least one of the joints thereof has a single tensioned member securing the members of the joint in mutually compressive relation, wherein at least one of said straight side members is of U-section metal having two flange portions and an intermediate web portion, said web portion having a portion of predetermined shape extending inwardly thereof, and projecting substantially at right-angles to said web portion, and lying between said flange portions, having an aperture therethrough to receive said tensioned member, said tensioned member being a carriage bolt having the head portion thereof recessed into the outermost member of the joint.

13. The framework as set forth in claim 12, wherein said framework side members consist of a plurality of horizontal longitudinal side members, a plurality of horizontal cross members, and a plurality of leg members; and wherein each said longitudinal side member and each said cross member has a said flap portion struck out therefrom, located adjacent one end thereof, said flap portion projecting substantially normally to said member and having an aperture to receive a tensioned bolt member therein; and an aperture in each said member, located adjacent the other end of said member, having a tensioned bolt member therethrough.

14. The framework as set forth in claim 13, wherein said leg members are each in facing relation with a first said horizontal member having a said flap portion, said leg member being adjacent said flap portion, and in sandwiched relation between said first member and another said horizontal member having a said aperture to receive said tensioned member therethrough, said tensioned member being a bolt and nut in engaged relation with said flap portion.

15. The framework as set forth in claim 14, wherein said horizontal members and said leg members are structural section of U-form.

16. The framework as set forth in claim 14, wherein said tensioned bolt member has a spacer member thereabout, located between said flap portion and said leg member, to limit the deflection of said flap member by said tensioned bolt.

17. The combination as set forth in claim 12, wherein said frame structure is a knock-down frame having at least two longitudinally extending rail members, at least two laterally extending cross-members, and four leg members, in mutually secured relation to form at least four corner joints, each joint having a rail member, a cross member and a leg member in secured, bolted relation, at least one said corner joint having a said leg member in facing, contacting relation with a said rail member, and another said corner joint having said leg member in facing contacting relation with a said cross-member, whereby said frame is stabilized laterally and longitudinally against folding.

18. The method of constructing a knock-down frame of metal section, including the steps of cutting a plurality of members of predetermined lengths to form said frame, and joining said members by a plurality of joints, each joint having at least two said members in joined relation; one said member serving as an anchor member, being perforated by way of a protruding flap, perforating other said joint members adjacent the ends thereof by way of bolt-holes, for assembly with a said anchor member; assembling said other members with said anchor members to form said frame joints; securing a bolt at each joint, having the head end of the bolt located outwardly of the outermost one of said joint members, said bolt extending through said joint members and through said flap, applying a nut to each said bolt, and tightening said nuts upon said bolts against a respective said protruding flap to tighten said joints in positioned, secured relation to form said knock-down frame.

19. The method as set forth in claim 18, wherein each said joint has at least three members in mutually secured relation.

* * * * *